(12) United States Patent
Shnaider et al.

(10) Patent No.: US 6,640,012 B1
(45) Date of Patent: Oct. 28, 2003

(54) IMAGE COMPRESSION SYSTEM AND METHOD OF DETERMINING QUANTIZATION PARAMETERS THEREFOR

(75) Inventors: Mikhail Shnaider, Ormond (AU); Xing Zhang, New South Wales (AU)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/496,202

(22) Filed: Feb. 2, 2000

(51) Int. Cl.[7] ................................................. G06K 9/36
(52) U.S. Cl. ....................................................... 382/239
(58) Field of Search ................................ 382/232, 236, 382/238, 240, 242, 248, 250; 348/384.1, 394.1, 395.1, 400.1–404.1, 407.1–416.1, 420.1, 421.1, 425.2, 430.1, 431.1; 375/240.18, 240.19; 341/51, 63, 65, 67, 107; 364/724.011, 724.04, 724.05, 724.13, 724.14, 725.01, 725.02

(56) References Cited

U.S. PATENT DOCUMENTS

| | | |
|---|---|---|
| 4,580,162 A | 4/1986 | Mori |
| 4,677,479 A | 6/1987 | Hatori et al. |
| 5,307,163 A | 4/1994 | Hatano et al. |
| 5,396,567 A | 3/1995 | Jass |
| 5,661,822 A * | 8/1997 | Knowles et al. ............. 382/233 |
| 5,748,121 A * | 5/1998 | Romriell ....................... 341/65 |
| 5,758,092 A * | 5/1998 | Agarwal ................. 395/200.77 |
| 6,208,692 B1 * | 3/2001 | Song et al. ............ 375/240.19 |

* cited by examiner

Primary Examiner—Jose L. Couso
(74) Attorney, Agent, or Firm—Kenneth A. Haas

(57) ABSTRACT

An image compression system (1) having a wavelet transform module (3) for decomposing an input image subdivided into blocks using a wavelet transformation utilizes a statistics generator (7) to determine average statistics over several blocks to provide an indication of the activity of a current image block. This activity value is passed to a quantisation control module (8) which determines quantisation parameters for a quantisation module (4) which quantises the transform coefficients output from the wavelet transform module (3). The quantised transform coefficients are the coded for onward transmission or storage by coder (5). The quantisation control module (8) also receives bit rate information for the current image block from a rate monitoring module, which determines the bit rate for the current block from a desired bit rate and information on the number of bits used for the previous image block.

10 Claims, 4 Drawing Sheets

IMAGE COMPRESSION SYSTEM AND METHOD OF DETERMINING QUANTIZATION PARAMETERS THEREFOR

FIELD OF THE INVENTION

This invention relates to an image compression system and to a method of determining quantisation parameters for such a system.

BACKGROUND OF THE INVENTION

In a typical transform-based image compression system, an input image is first decomposed by a transform to provide transform coefficient data, which data is then quantised and then coded for onward transmission or storage. In the decoding process, the coded data must be requantised and inverse transformed to reconstruct the original image. However, when the image compression system is run on a device with limited auxiliary memory, it is often impossible to load the whole image into memory. In such cases, the transform can be performed on a sequence of blocks comprising the entire image. Although the memory constraint is resolved by using the transform in a block by-block fashion, the quality of the compressed images is substantially degraded.

Many of the currently available image compression systems are based on a discrete cosine transform (DCT). Another transform used in such systems is the wavelet transform. Although DCT can be performed in a block-by-block fashion the nature of the DCT coefficients differs from that of the wavelet ones, so that the DCT based solutions are not generally applicable to wavelet-based image compression systems.

As described in US Pat. Nos. 4,677,479 (Hatori) and U.S. Pat. No. 5,396,567 (Jass), in order to improve further the compression factor of the system, the quantization parameters can be dynamically adjusted based on an activity value of the block. The activity value is an indication of how much the image in the block has changed and is generally determined by a statistical analysis of the picture elements (pixels) in the block.

In the former patent mentioned above, a parameter such as a variance or a mean value of picture element values in a region to be requantised is calculated on the basis of sub-sampled picture element values and, according to this parameter, a quantiser's parameters are adaptively varied for each region.

However, the system disclosed in this patent calculates the parameter based on pixel values and requires multiple passes (requantisation). In the latter patent mentioned above, each image block is subdivided into subregions and the activity value is determined for each subregion from the pixel values in the subregion. A subregion parameter is then calculated for each subregion from the activity value and a block parameter is determined by summing the subregion parameters. However, this system only relates to DCT transform systems.

The known image compression systems require the same bit rate to be used to code each of the image blocks. When the quantisation parameters are being dynamically adjusted for each block, the number of bits necessary for coding each image block changes. Thus, in order to maintain the desired bit rate on a block-by-block basis, the system is often run several times over the same block. This is known as multi-pass and, although it provides the desired bit rate, it is computationally expensive and takes longer to encode the image. This is clearly undesirable, especially for portable, power-limited devices.

Furthermore, setting a desired bit rate to be equal for all the blocks does not take into account the non-homogeneity of the image data and, as a result, leads to non-optimal image coding. Consequently, the quality of the compressed image is degraded.

BRIEF SUMMARY OF THE INVENTION

The present invention therefore seeks to provide an image compression system and to a method of determining quantisation parameters for such a system which overcomes, or at least reduces the above-mentioned problems of the prior art.

Accordingly, in one aspect, the invention provides an image compression system comprising:

a wavelet transform module having an input and an output, the input being coupled to an input terminal of the image compression system for receiving image data in the form of image blocks and the output providing wavelet transform coefficients for each image block;

a quantisation module having an input and an output, the input being coupled to the output of the wavelet transform module and the output providing quantised wavelet transform coefficients for each image block;

a coding module having an input and an output, the input being coupled to the output of the quantisation module and the output being coupled to an output terminal of the image compression system for providing compressed image data comprising coded quantised wavelet transform coefficients for each image block;

an activity value generator having an input and an output, the input being coupled to the output of the wavelet transform module; and a quantisation control module having first and second inputs and an output, the first input being coupled to the output of the activity value generator, the second input being coupled to receive a required quantisation rate, and the output being coupled to a control input of the quantisation module, wherein the activity value generator generates activity values representing a statistical analysis of the wavelet transform coefficients, the activity values being provided at the output of the activity value generator.

In a second aspect, the invention provides a method of determining quantisation parameters for an image compression system, the method comprising the steps of:

receiving wavelet transform coefficients for each of a plurality of image blocks making up an image;

determining an activity value based on statistical analysis of the wavelet transform coefficients for a current image block;

determining quantisation parameters for the current image block based the activity value and a required quantisation rate.

BRIEF DESCRIPTION OF THE DRAWINGS

One embodiment of the invention will now be more fully described, by way of example, with reference to the drawings, of which.

DETAILED DESCRIPTION OF THE DRAWINGS

Figure 1:
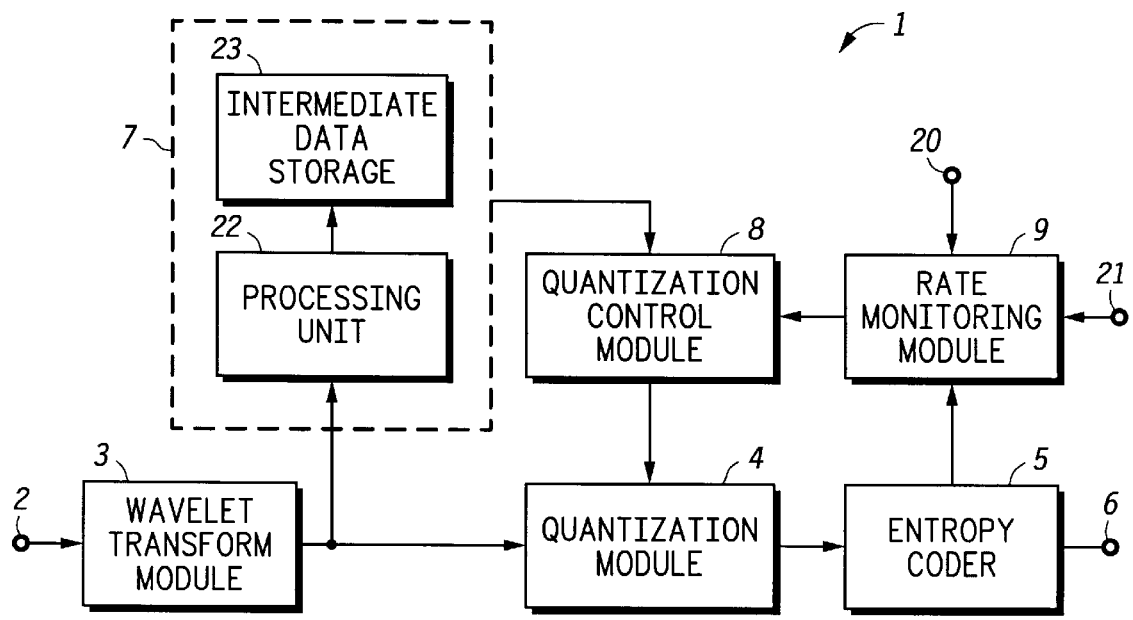
FIG. 1 shows a schematic block diagram of an image compression system according to one embodiment of the invention.
Figure 2:
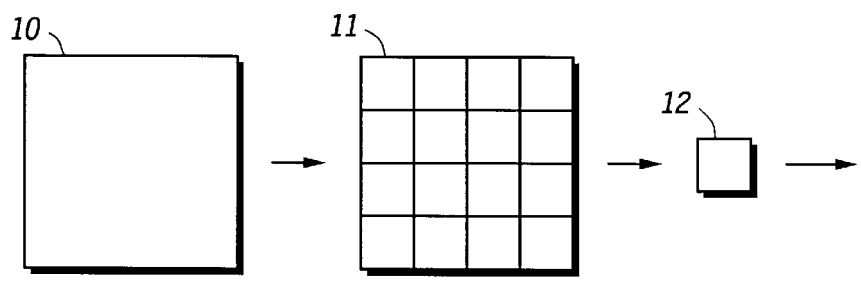
FIG. 2 shows an example of an image split into a plurality of image blocks.

Thus, as shown in FIG. 1, an image compression system 1 includes an input terminal 2 for receiving an image, which may, or may not, be split into image blocks. Referring here to FIG. 2, an image 10, if it is too large to be handled as a single image, is split into a plurality of blocks, shown as a 4×4 matrix with 16 blocks 11, in this example. Each block 12 is then taken separately and passed to the input terminal 2 of the image compression system 1 of FIG. 1. The input terminal 2 is coupled to a wavelet transform module 3, where the input image block is mapped onto a frequency plane by means of the wavelet transform. The wavelet transform module 3 thus produces transform coefficients, which are passed to a quantization module 4, where the transform coefficients are quantised and then passed to an entropy coder 5, where the quantised transform coefficients are coded for onward transmission or storage from output terminal 6.

Figure 3:
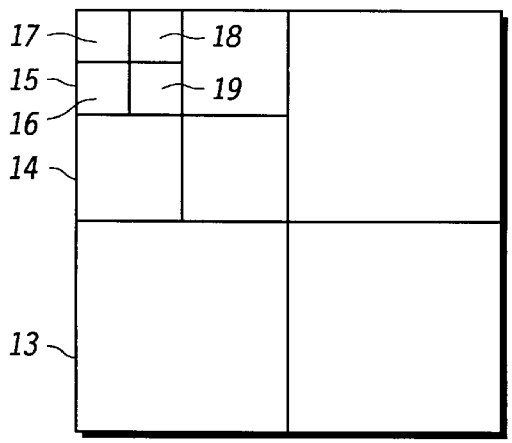
FIG. 3 shows a flow chart of the process flow of part of the embodiment shown in FIG. 1.

One of the possible layouts of a wavelet transform coefficient matrix 13 is depicted in FIG. 3, which shows how a 3-level decomposition is obtained, assuming that the signal is passed through a low-pass filter and a high-pass filter. The most typical multilevel decomposition involves the transformation of the coefficients obtained in the band which is processed only with low-pass filters, where the low-pass set of coefficients represented by quadrant 14 has been decomposed into four quadrants and the low-pass set of coefficients from this second level of decomposition represented by quadrant 15 is decomposed a third time to produce the four quadrants 16, 17, 18 and 19 to provide the third level of decomposition. The locations on the matrix of each quadrant are referred to as wavelet bands. The actual number of bands may vary and typically depends on the application. Referring again to FIG. 1, the wavelet coefficients for each block at the output of the wavelet transform module 3 are also passed to a statistics generator 7. The statistics generator 7 is used in the system to calculate statistics for the transform coefficients. Although the term "statistics" is generally taken to refer to the mean and variance of the transform coefficients of each block, other statistical descriptions of the distribution of the transform coefficients can be used, for instance, kurtosis. The statistics are calculated for each wavelet band independently of the other bands, as will be more fully described below.

The statistics generated by the statistics generator 7 are then passed to a quantization control module 8 which utilizes the statistics to generate quantization parameter values to be used by the quantization module 4 when quantizing the transform coefficients provided from the wavelet transform module 2. In generating the quantization parameters, the quantization control module 8 also receives an input from a rate monitoring module 9, which is coupled to receive data from the entropy coder 5, as will be more fully described below. The rate monitoring module 9 also receives data from an input 20 regarding a desired bit coding rate and from an input 21 regarding Regions Of Interest (ROI) which may exist in the image, as will also be more fully described below.

The statistics generator 7 is formed by a processing unit 22 and an intermediate data storage unit 23, which is used for storing average values of the statistics calculated for blocks that have already been processed. Thus, if the system 1 is processing an image block N, the average statistics at that moment of time refer to the blocks between 1 and N−1. The processing unit 22 thus calculates the statistics for the current block N and calculates updated average statistics, which are provided back to the intermediate data storage unit 23 and to the quantisation control module 8. It will of course be appreciated that the updated average statistics can be provided to the quantisation control module either from the intermediate data storage unit 23 or directly from the processing unit 22.

The average statistics described above provide an indication of the activity of the image. In this preferred embodiment, the average statistics that are generated are the average mean $\mu_{aver}^{N}(i)$ and the average variance $$\mu_{aver}^{N}(i) = \frac{1}{N}(\mu_{curr} + (N-1)\mu_{aver}^{N-1}(i)) \quad \text{and}$$

$$\sigma_{aver}^{N}(i) = \frac{1}{N}(\sigma_{curr} + (N-1)\sigma_{aver}^{N-1}(i))$$

where i is the index of a wavelet band within a current block N, $\mu_{aver}^{N}(i)$ and $\sigma_{aver}^{N}(i)$ are the average mean and average variance of the i-th wavelet band after processing the current block N and $\mu_{curr}$ and $\sigma_{curr}$ are the mean and variance of the current wavelet band in the current block N.

Figure 4:
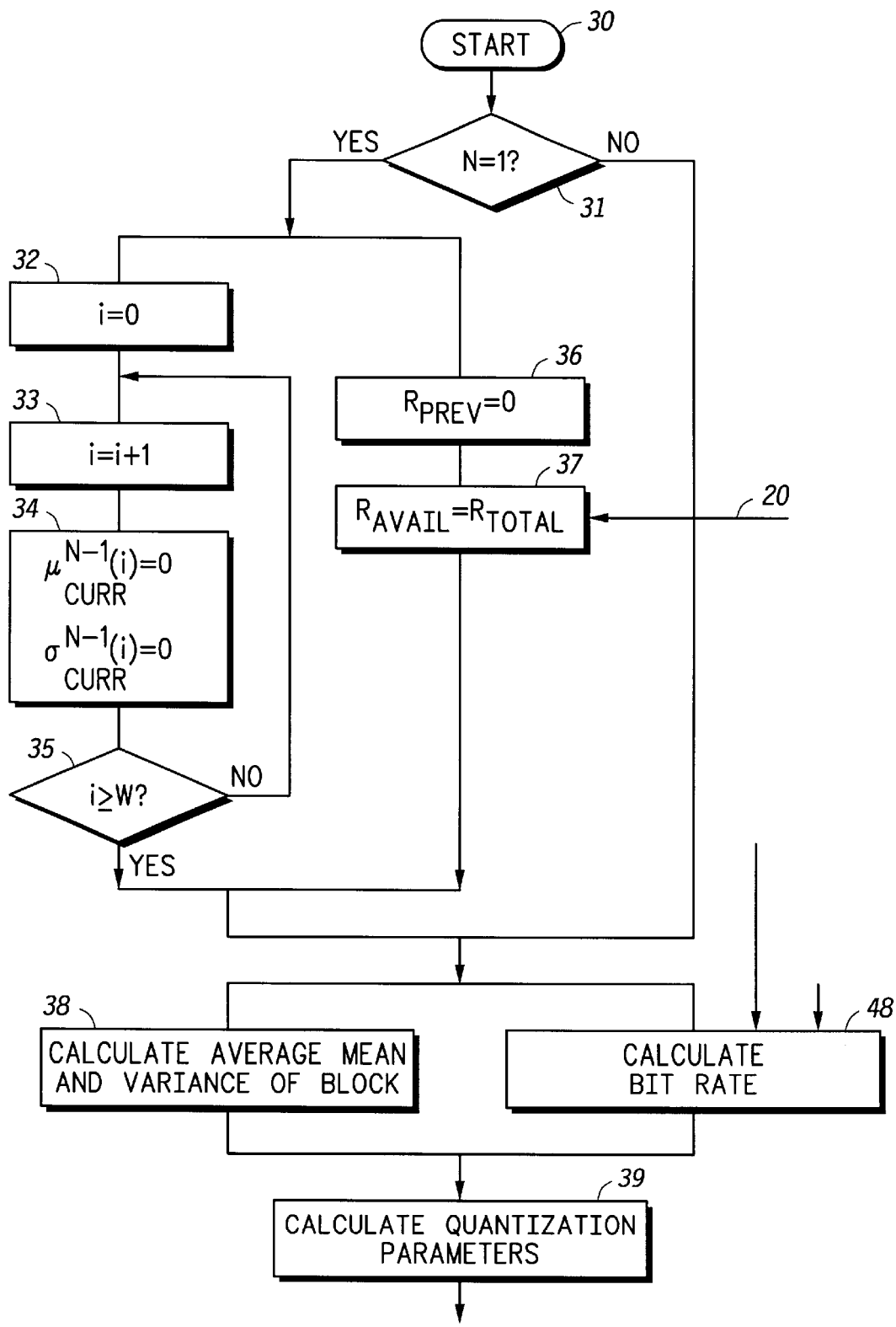
FIG. 4 shows a flow chart of a detailed part of the process flow chart of FIG. 3.

Turning now additionally to FIG. 4, the operation of the statistics generator 7, quantisation module 8 and rate monitoring module 9 will now be more fully described. As shown in FIG. 4 values of the transform coefficients from the wavelet transform module 3 are received at step 30 and the processing unit 23 of the statistics generator 7 determines, in step 31, whether the transform coefficients relate to a first block of the image, such that the block coefficient N=1 or whether they relate to a subsequent image block such that N>1. If N=1, then the process flows moves to step 32, where the index i of the wavelet band in the block is set to zero and then incremented by one so that i=i+1 in step 33.

The average values of the statistics for the i-th wavelet band stored in the intermediate data storage unit 23 are then initialized to be zero, as shown in step 34. The processing unit then determines whether the value of i has reached the maximum number W of wavelet bands in the block, as shown in step 35. If i is greater than or equal to W then the process flow goes on to calculate the average mean and variance of the wavelet bands in the block, as shown in step 38 and will be more fully described below. If i is less than W, then the process flow returns to step 33 where the value of i is incremented again and the process flow continues on to steps 34 and 35, as before.

While the statistics generator 7 is carrying out step 31, the rate monitoring module 9 initializes to zero a value $R_{prev}$ indicating the number of bits used for coding a previous block, as shown in step 36. The rate monitoring module 9 also sets, in step 37, a value $R_{avail}$ representing the number of bits remaining which are available for coding the remainder of the image to be equal to $R_{total}$ being the total number of bits available to code the entire image, which is provided as a desired bit coding rate at the input 20. The desired bit coding rate is typically the number of bits available to encode the entire image divided by the number of pixels in the image. The process flow then goes on to calculate the average mean and variance of the wavelet bands in the block, as shown in step 38.

Figure 5:
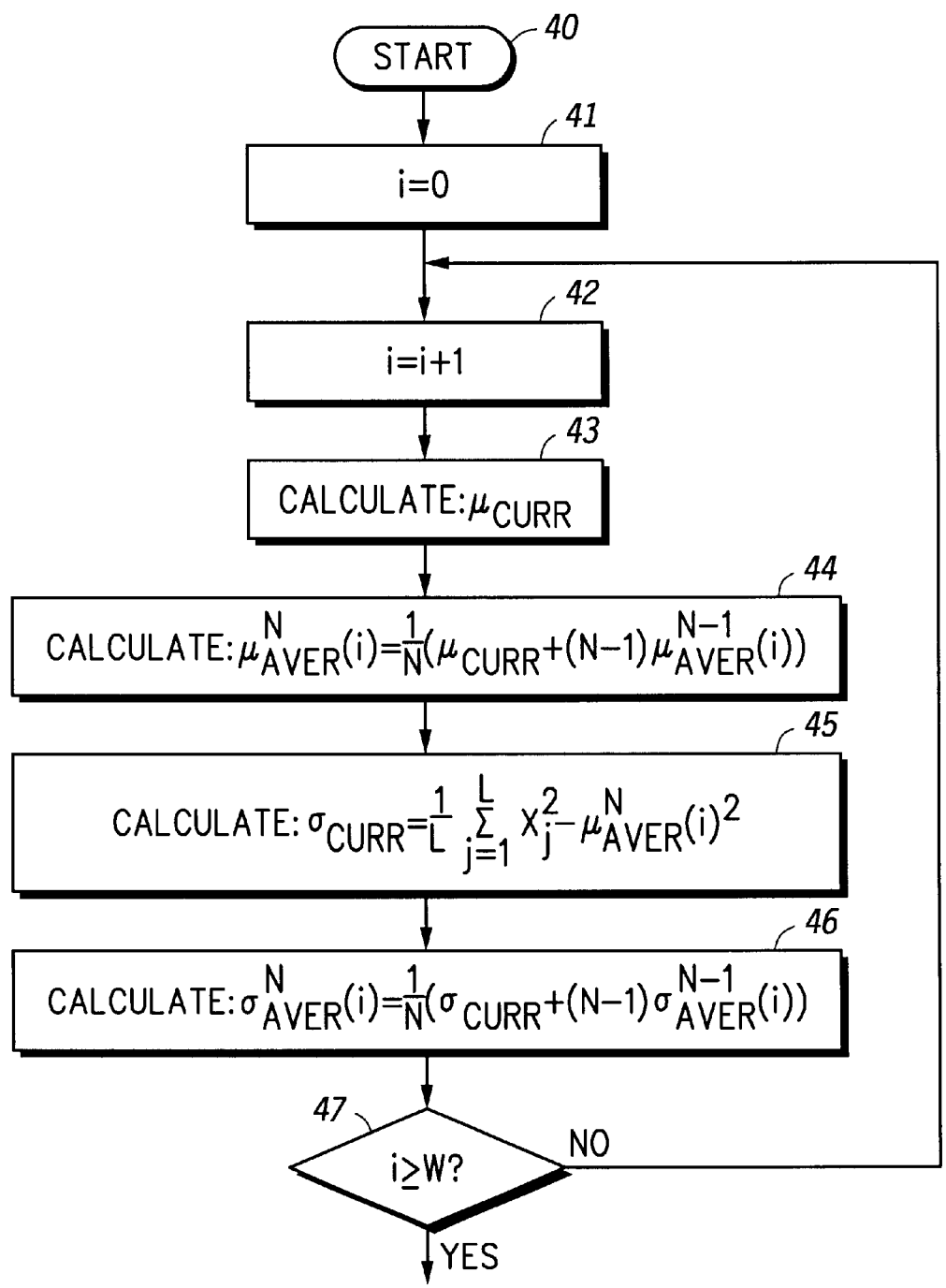
FIG. 5 shows a flow chart of a second detailed part of the process flow chart of FIG. 3.

Returning now to step 31, if the transform coefficients relate to a subsequent image block such that N>1, the process flow moves directly to step 38, the process flow of which is shown in more detail in FIG. 5. Turning, thus, to FIG. 5, the values of the transform coefficients from the wavelet transform module 3 are received at step 40. The band index i is then set to zero in step 41 and then incremented by one so that i=i+1 in step 42. Then, in step 43, the current mean of the transform coefficients for the current wavelet band in the block is calculated as follows:

$$\mu_{curr} = \frac{x_1 + x_2 + x_3 + \ldots x_L}{L}$$

Next, the average of the mean values of the wavelet band i over all the previous and the current blocks is determined, as shown in step 44. Here, the previous average mean value $\mu_{aver}^{N-1}(i)$, that is the average mean as determined up to the previous block N-1 for the i-th wavelet band, is taken from the intermediate data storage unit 23 and multiplied by the number of blocks (N-1) used to determine it, the current mean $\mu_{curr}$ is added and the total is divided by the number of blocks up to and including the current block (N). Thus, as indicated above, the average mean value is calculated as follows:

$$\mu_{aver}^{N}(i) = \frac{1}{N}(\mu_{curr} + (N-1)\mu_{aver}^{N-1}(i))$$

This updated average mean value $\mu_{aver}^{N-}(i)$ is then stored in the intermediate data storage unit 23 and may also be passed to the quantisation control module 8. The activity of the image is effectively the average variance $\sigma_{aver}^{N}(i)$ of the wavelet coefficients. In this embodiment, the average variance $\sigma_{aver}^{N}(i)$ calculated based on the previous blocks with indices between 1 and N-1 However, if a look ahead block buffer is used the estimation of $\sigma_{aver}^{N}(i)$ can be based on the previous as well as subsequent blocks. The number of subsequent blocks that can be used for the calculation depends on the size of the look ahead block buffer.

Thus, in order to calculate the average variance $\sigma^{averN}(i)$ of the i-th wavelet band, the current variance $[\mu_{curr}]\sigma_{curr}$ must first is caiculated as indicated in step 45 of FIG. 5. In this step, the current variance $[\mu_{curr}]\sigma_{curr}$ is calculated by taking the sum of the squares of the transform coeffients for the current wavelet band and dividing by the total number of comeliest in the band and the subtracting the square Of the average mean value, is previously calculated in step 44, as follow:

$$\sigma_{curr} = \frac{1}{L}\sum_{i=1}^{L} x_j^2 - \mu_{aver}^{N}(i)^2$$

where $X_j$, is the value of the j-th transform coefficient in a wavelet band and L is the Total number of coefficients in the band. From this Current variance, the average variance is calculated, as indicated by step 46. In step 46, the previous average variance value $\sigma_{aver}^{N}(i)$ that is the average variance as determined up to the previous block N-1 for the i-th wavelet band, is taken from the intermediate data storage unit 23 and multiplied by the number of blocks (N-1) used to determine it, the current variance $[\mu_{curr}]\sigma_{curr}$ is added and the total is divided by the number of blocks up to and including the current block (N).

$$\sigma_{aver}^{N}(i) = \frac{1}{N}(\sigma_{curr} + (N-1)\sigma_{aver}^{N-1}(i))$$

The process flow then continues to step 47 where it checks whether the value of i has reached the maximum number W of wavelet bands in the block. If i is less than W, then the process flow returns to step 42 where the value of i is incremented again and the process flow continues on to through steps 43 to 46, as before. If i is greater than or equal to W then the step 38 in FIG. 4 is completed and the process flow continues to step 39, where the quantisation parameters are calculated, as will be more fully described below.

Figure 6:
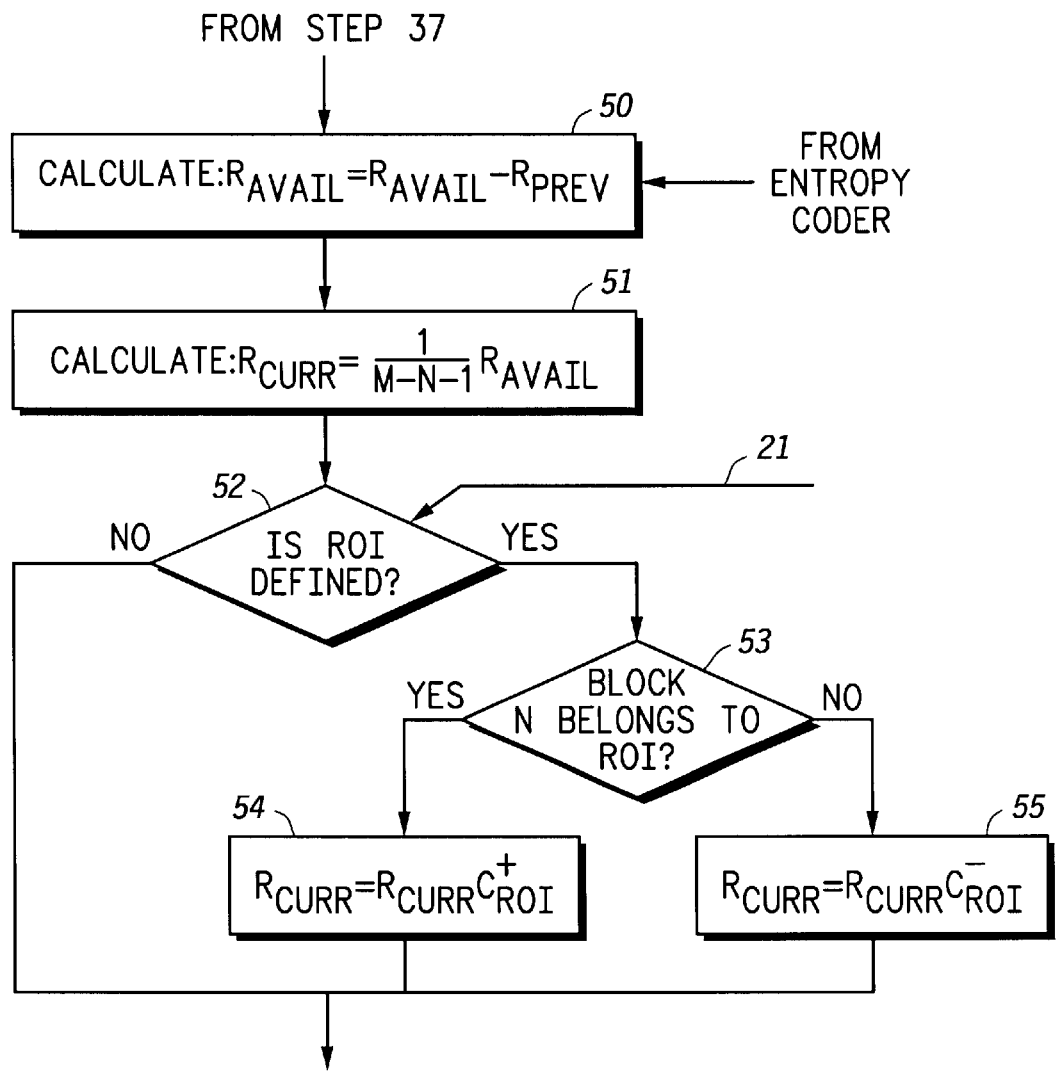
FIG. 6 shows a flow chart of a second detailed part of the process flow chart of FIG. 4.

As mentioned above, the rate monitoring module 9 shown in FIG. 1 keeps track of the number of bits used at the end of compression of every image block. Based on this information and also on the desired bit rate for the entire image, the rate monitoring module 9 generates the bit rate for the current block $R_{curr}$, as indicated by step 48 in FIG. 4, the process flow of which is shown in more detail in FIG. 6. Turning, thus, to FIG. 6, the bit rate available for all the remaining blocks $R_{avail}$, as initialized in step 37 of FIG. 4, is received at step 50 of FIG. 6. Also provided as an input to step 50 is the value $R_{prev}$, indicating the number of bits used for coding the previous block. This information is received from the entropy coder 5, which updates the value $R_{prev}$, which had previously been initialized to zero in step 36 of FIG. 4. Thus, in step 50, the bit rate available for the remaining blocks is updated by taking the previous available bit rate and subtracting from it the number of bits used for the previous block, as follows:

$$R_{avail} = R_{avail} - R_{prev}$$

The average available bit rate for the current block $R_{curr}$, is then calculated, as indicated by step 51 by dividing the updated available bit rate by the number of blocks remaining to be coded, as follows:

$$R_{curr} = \frac{1}{M - N - 1} R_{avail}$$

where M is the total number of blocks and N is the current block.

In addition to the number of bits used and the desired bit rate, the rate monitoring module 9 can also incorporate some other information regarding the image. For example, if a Region Of Interest (ROI) in an image is specified, the bit rate for the current block can be either increased or decreased depending on whether the current block belongs to the Region Of Interest or not. ROI information is input to the rate monitoring module 9 via the input terminal 21, as shown in FIG. 1. This information is shown in FIG. 6 being input to the next step 52. In step 52, the rate monitoring module 9 determines whether or not any Regions Of Interest are defined for the image. If there is no ROI information, or information indicating that there are no particular Regions Of Interest in this image, then the current bit rate, as calculated in step 51, is passed through to the quantisation parameter calculation step 40 in FIG. 4. If there is ROI information indicating that there is a Region Of Interest in the image, then the rate monitoring module 9 determines, as indicated in step 53, whether the current block is within the ROI or outside the ROI. If the current block belongs to the ROI, then the rate monitoring module 9 adjusts the average available bit rate for the current block $R_{curr}$ by a factor $C_{ROI}^+$ as indicated in step 54, so as to increase the number of bits used for the current block. If, on the other hand, the current block does not belong to the ROI, so that it is less important, then the rate monitoring module 9 adjusts the average available bit rate for the current block $R_{curr}$ by a factor $C_{ROI}^-$, as indicated in step 55, so as to decrease the number of bits used for the current block. The scaling factor $C_{ROI}$, with a superscript of "+" or "−" depending on whether the current block belongs to ROI or not, is a predetermined constant. From either step 54 or step 55, the scaled value of the current bit rate is output from the rate monitoring module 9 to the quantisation control module of FIG. 1, to step 39 in FIG. 4.

Referring again to FIG. 4, the process flow now proceeds, in step 39, to calculate, in the quantisation control module 8 of FIG. 1, the quantisation parameters required by the quantisation module 4. For example, based on the information provided to the quantisation control module 8 from the rate monitoring module 9 (the current bit rate) and the statistics generator 7 (the average mean and variance), the quantisation control module 8 can generate the step size for the quantisation module 4, if the quantisation is conventional. Alternatively, the quantisation control module 8 can provide bit plane parameters required to encode the current block at a given bit rate if the quantisation is to be bit plane. Thus, the quantisation control module 8 adjusts the actual bit rate to be used for the current block from the scaled average available bit rate according to the activity value(s) provided by the statistics generator, which includes the average variance and may also include the average mean, as described above.

The procedure used by the quantisation control module 8 for calculation of the step size or number of bit plane used in the invention is known and is rather complex. It basically involves modeling of the wavelet coefficients, as follows:

The probability distribution of wavelet coefficients is modeled by a so-called Generalised Gaussian distribution (GGD). The GGD has a number of tunable parameters. These parameters depend on the actual wavelet coefficients of the current block. An example of such a parameter is the variance of the wavelet coefficients. It will be remembered that a number of variances are calculated for every block of wavelet coefficients. There is one variance per band. The number of bands in a block depends on the wavelet decomposition structure used, as explained above with reference to FIG. 3. The bit rate provided by the rate monitoring module 9 is the bit rate for a whole block. Since every band in a block is quantized separately from other bands in the same block, the bit rate is adjusted band-by-band but the overall rate remains the same as specified by the rate monitoring module. Next the problem of bit rate allocation across bands in a block from a total bit rate for this block must be solved. The bit allocation across bands is based on the minimisation of a so-called rate-distortion function. The rate-distortion function determines how much distortion is produced if a particular source is quantized at a particular bit rate. The minimisation of the distortion function results in a separate bit rate for each band in a block. Finally, based on the obtained bit rates and the variances of the bands, the step sizes can be calculated. Obviously, the step sizes are also different for different bands. Therefore, the step size Delta(i) for each band is calculated as follows:

$$\text{Delta}(i) = F(r(i), \text{sigma}(i))$$

where i is the index of a band in a block, r(i) is the bit rate for the i-th band and sigma(i) is the variance of the i-th band.

The function F(.) is a curve that is typically found experimentally. The same procedure is generally used to calculate the number of bit planes.

After the quantization parameters have been determined by the quantisation control module, they are passed to the quantisation module 4, where they are used to quantise the wavelet transform coefficients from the wavelet transform module 3. The quantised wavelet coefficients are then coded in an appropriate coder, such as the entropy coder 5 to provide the coded quantised wavelet transform coefficients at the output terminal 6 of the compression system.

Thus, by introducing the intermediate data storage unit 23 and the rate monitoring module 9 into the compression system, an entire image can be encoded in a single pass. Therefore, the need for multi-pass coding is eliminated. At the same time the desired bit rate can be guaranteed and the computational requirements are greatly reduced. Furthermore, the quality of block-based image coding is improved. On the other hand, the increase in the complexity of the system, after introducing the new modules, is insignificant in terms of both memory and computation compared with the rest of the compression system.

It will be appreciated that although only one particular embodiment of the invention has been described in detail, various modifications and improvements can be made by a person skilled in the art without departing from the scope of the present invention.

We claim:

1. An image compression system comprising:
    a wavelet transform module having an input and an output, the input being coupled to an input terminal of the image compression system for receiving image data in the form of image blocks and the output providing wavelet transform coefficients for each image block;
    a quantisation module having an input and an output, the input being coupled to the output of the wavelet transform module and the output providing quantised wavelet transform coefficients for each image block;
    a coding module having an input and an output, the input being coupled to the output of the quantisation module and the output being coupled to an output terminal of the image compression system for providing compressed image data comprising coded quantised wavelet transform coefficients for each image block;
    an activity value generator with a memory, the activity generator having an input and an output, the input being coupled to the output of the wavelet transform module; and
    a quantisation control module having first and second inputs and an output, the first input being coupled to the output of the activity value generator, the second input being coupled to receive an available bit rate, and the output being coupled to a control input of the quantisation module,
        wherein the activity value generator generates activity values representing a statistical analysis of the wavelet transform coefficients, and in use the memory stores updated average activity values calculated using the activity values calculated for a current image block and previous average activity values stored in the memory, and wherein the updated average activity values are provided at the output of the activity value generator.

2. An image compression system according to claim 1, wherein the updated average activity values are calculated using activity values calculated for at least one image block subsequent to the current image block.

3. An image compression system according to claim 1, further comprising a bit rate monitoring module having a first input for receiving a predetermined total image bit rate, a second input coupled to the coding module for receiving information regarding the number of bits used for coding previous image blocks, and an output coupled to the second input of the quantisation control module for providing the available bit rate.

4. An image compression system according to claim 3, wherein the bit rate monitoring module has a third input for receiving information regarding a region of interest in a current image block.

5. A method of determining quantisation parameters for an image compression system, the method comprising the steps of:

receiving wavelet transform coefficients for each of a plurality of image blocks making up an image;

determining an activity value based on statistical analysis of the wavelet transform coefficients for a current image block by updating a previous stored average activity value using the activity value determined for the current image block and storing the updated average activity value as a new stored average activity value; and determining quantisation parameters for the current image block based on the activity value and an available bit rate, wherein the determining quantisation parameters utilizes the updated average activity value.

6. A method of determining quantisation parameters according to claim 5, wherein the step of determining an activity value comprises:

updating a previous stored average activity value using an activity value determined for an image block subsequent to the current image block; and storing the updated average activity value as a new stored average activity value; wherein the step of determining quantisation parameters for the current image block utilizes the updated average activity value.

7. A method of determining quantisation parameters according to claim 5, wherein the available bit rate is determined by the steps of:

receiving a desired image bit rate;

receiving information regarding a number of bits already used by the image compression system; and determining the available bit rate based on the desired bit rate and the number of available bits.

8. A method of determining quantisation parameters according to claim 6, wherein the available bit rate is determined by the steps of:

receiving a desired image bit rate;

receiving information regarding a number of bits already used by the image compression system; and determining the available bit rate based on the desired bit rate and the number of available bits.

9. A method of determining quantisation parameters according to claim 6, wherein the step of determining the available bit rate is further based on information regarding a region of interest in the image data.

10. A method of determining quantisation parameters according to claim 9, wherein the step of determining the available bit rate includes the step of scaling the available bit rate based upon whether a current image block is within or outside the region of interest.

* * * * *